(12) United States Patent
O'Donnell et al.

(10) Patent No.: US 9,329,881 B2
(45) Date of Patent: May 3, 2016

(54) OPTIMIZED DEPLOYMENT OF DATA SERVICES ON THE CLOUD

(71) Applicants: Tony O'Donnell, Kildare Town (IE); Paul Sheedy, Dublin (IE)

(72) Inventors: Tony O'Donnell, Kildare Town (IE); Paul Sheedy, Dublin (IE)

(73) Assignee: SAP SE, Walldorf (DE)

( * ) Notice: Subject to any disclaimer, the term of this patent is extended or adjusted under 35 U.S.C. 154(b) by 390 days.

(21) Appl. No.: 13/868,516

(22) Filed: Apr. 23, 2013

(65) Prior Publication Data

US 2014/0317617 A1    Oct. 23, 2014

(51) Int. Cl.
*G06F 9/455*     (2006.01)
*G06F 9/50*      (2006.01)

(52) U.S. Cl.
CPC ............ *G06F 9/45533* (2013.01); *G06F 9/455* (2013.01); *G06F 9/5027* (2013.01); *G06F 2209/5013* (2013.01)

(58) Field of Classification Search
None
See application file for complete search history.

(56) References Cited

U.S. PATENT DOCUMENTS

| | | | |
|---|---|---|---|
| 6,678,682 B1 * | 1/2004 | Jenkins ................ | H04L 63/101 |
| 7,676,786 B2 * | 3/2010 | Shenfield ................ | G06F 8/10 |
| | | | 717/104 |
| 7,716,665 B2 * | 5/2010 | Buehler .............. | G06F 17/3089 |
| | | | 709/250 |
| 8,468,119 B2 | 6/2013 | Kumar et al. | |
| 8,478,623 B2 | 7/2013 | Friedlander et al. | |
| 8,527,494 B2 | 9/2013 | O'Donnell et al. | |
| 8,606,878 B2 | 12/2013 | Ferris | |
| 8,627,426 B2 | 1/2014 | Lucovsky et al. | |
| 8,667,024 B2 | 3/2014 | Anand et al. | |
| 8,732,145 B1 * | 5/2014 | Lewitt ................ | G06F 9/45558 |
| | | | 706/45 |
| 8,751,573 B2 | 6/2014 | Said et al. | |
| 8,813,065 B2 * | 8/2014 | Zygmuntowicz ......... | G06F 8/60 |
| | | | 717/120 |
| 2004/0230661 A1 * | 11/2004 | Rashid et al. ............ | 709/207 |
| 2005/0060704 A1 * | 3/2005 | Bulson et al. ............ | 718/1 |
| 2007/0136324 A1 * | 6/2007 | Xu et al. .................. | 707/100 |
| 2007/0288224 A1 * | 12/2007 | Sundarrajan et al. ....... | 703/22 |
| 2011/0231552 A1 | 9/2011 | Carter et al. | |
| 2011/0265164 A1 * | 10/2011 | Lucovsky et al. ............ | 726/7 |
| 2012/0150792 A1 * | 6/2012 | Yassin et al. ............ | 707/602 |
| 2012/0266168 A1 * | 10/2012 | Spivak et al. ............ | 718/1 |
| 2012/0278812 A1 * | 11/2012 | Wang .................. | 718/104 |
| 2012/0310875 A1 | 12/2012 | Prahlad et al. | |

(Continued)

*Primary Examiner* — Hiren Patel
(74) *Attorney, Agent, or Firm* — Fish & Richardson P.C.

(57) ABSTRACT

Methods, systems, and computer-readable storage media for providing on-demand data services. In some implementations, actions include receiving a request for execution of a data services job, the data services job including interactions between at least one of a plurality of applications hosted on a cloud platform and a plurality of application components within an application hosted on the cloud platform, each application including one or more application schemas, each application schema only being accessible by a respective application component, in response to the request, retrieving the data services job from a job repository, scheduling execution of the data services job by a virtual machine (VM) of a plurality of VMs, the VM being stateless and providing interaction between the at least one of the plurality of applications and the plurality of application components, and executing the data service job using the VM.

12 Claims, 8 Drawing Sheets

(56) References Cited

U.S. PATENT DOCUMENTS

| | | |
|---|---|---|
| 2013/0159897 A1 | 6/2013 | Misovski et al. |
| 2013/0159984 A1 | 6/2013 | Misovski et al. |
| 2013/0198743 A1* | 8/2013 | Kruglick ............................ 718/1 |
| 2013/0262556 A1* | 10/2013 | Xu et al. ........................ 709/202 |
| 2013/0339518 A1 | 12/2013 | Schimpfky et al. |
| 2014/0007132 A1 | 1/2014 | Gaxiola et al. |
| 2014/0040473 A1* | 2/2014 | Ho et al. ........................ 709/226 |
| 2014/0046909 A1* | 2/2014 | Patiejunas et al. ............ 707/687 |
| 2014/0067824 A1 | 3/2014 | DeLuca et al. |
| 2014/0096128 A1 | 4/2014 | Pohlmann |
| 2014/0279934 A1* | 9/2014 | Li et al. ........................ 707/687 |

\* cited by examiner

OPTIMIZED DEPLOYMENT OF DATA SERVICES ON THE CLOUD

BACKGROUND

Data can be stored across a plurality of databases. In some examples, each database can store data in a respective data schema. Data schemas can be disparate between databases. Cross-schema and cross-database data access is a long-established problem domain, and has led to a set of tools collectively providing extraction, transformation and loading (ETL) functionality. Extraction can be defined as a process for retrieving data from a source or set of sources. Transformation can refer to data manipulation such as reformatting, error correction, normalization of information, and the like. Loading can be defined as the delivery of outputs to a target database or set of databases.

A number of products and solutions exist for ETL in conventional on-premise landscapes. An on-premise landscape can include applications and/or data sources that are local to an entity (e.g., an enterprise). For example, an on-premise application is a computer-executable application that is locally executed using computing devices that are operated by the enterprise (e.g., a company). Existing ETL solutions can require bespoke configuration, maintenance and operation.

A direct replication to an on-demand landscape, or cloud space, is considered sub-optimal due to potentially low levels of service utilization, and the high resource costs of providing large volumes of frequently redundant servers. An on-demand landscape can include applications and/or data sources that are hosted by a third-party service provider (e.g., a cloud service provider). For example, an on-demand application is a computer-executable application that is hosted on a platform provided by a service provider and that is remotely accessed by one or more entities (e.g., enterprises).

SUMMARY

Implementations of the present disclosure include computer-implemented methods for providing on-demand data services. In some implementations, actions include receiving a request for execution of a data services job, the data services job including interactions between at least one of a plurality of applications hosted on a cloud platform and a plurality of application components within an application hosted on the cloud platform, each application including one or more application schemas, each application schema only being accessible by a respective application component, in response to the request, retrieving the data services job from a job repository, scheduling execution of the data services job by a virtual machine (VM) of a plurality of VMs, the VM being stateless and providing interaction between the at least one of the plurality of applications and the plurality of application components, and executing the data service job using the VM.

In some implementations, each VM of the plurality of VMs includes a data services component that is wrapped in a web-application, the web-application brokering access between data sources during execution of the data service job.

In some implementations, the web-application receives data service jobs, writes connectivity information based on a received data services job, executes the received data services job, and provides log information indicating a status of the received data services job.

In some implementations, the web-application deletes connectivity information from the VM in response to completion of the data services job.

In some implementations, the VM is only able to access one or more data sources associated with the data services job during execution of the data services job.

In some implementations, actions further include, during a design-time, storing the data services job in the job repository, the data services job being stored as a computer-readable document.

In some implementations, the computer-readable document provides a mapping between one or more data sources and one or more platform coordinates, each platform coordinate indicating a location of an application of the plurality of applications within the cloud platform.

In some implementations, actions further include, during design time: generating a document having a first format, and exporting the document to provide the computer-readable document, the computer-readable document having a second format that is different from the first format.

In some implementations, the first format includes ATL and the second format comprises XML.

In some implementations, the computer-readable document includes one or more fragments, each fragment representing a particular data source that is to be accessed at run-time, and one or more tuples, each tuple representing coordinates of an application of the plurality of applications within the cloud platform.

In some implementations, actions further include transmitting a message to the VM, the message including the data service job, data source metadata for each data source that is to be accessed during execution of the data services job.

In some implementations, the message further includes a name of the data services job, a unique identifier, and a callback endpoint for receiving log messages from the VM.

In some implementations, the data source metadata includes credentials and a resource locator for each data source that is to be accessed during execution of the data services job.

In some implementations, actions further include completing execution of the data services job, wherein, in response to completion of the data services job, the VM deletes connectivity credentials associated with the data services job, delete the data services job from a repository that is local to the VM, and transmits a confirmation message indicating that the VM is reset and is available for execution of a subsequent data services jobs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the

DESCRIPTION OF DRAWINGS

Like reference symbols in the various drawings indicate like elements.

DETAILED DESCRIPTION

Figure 1:
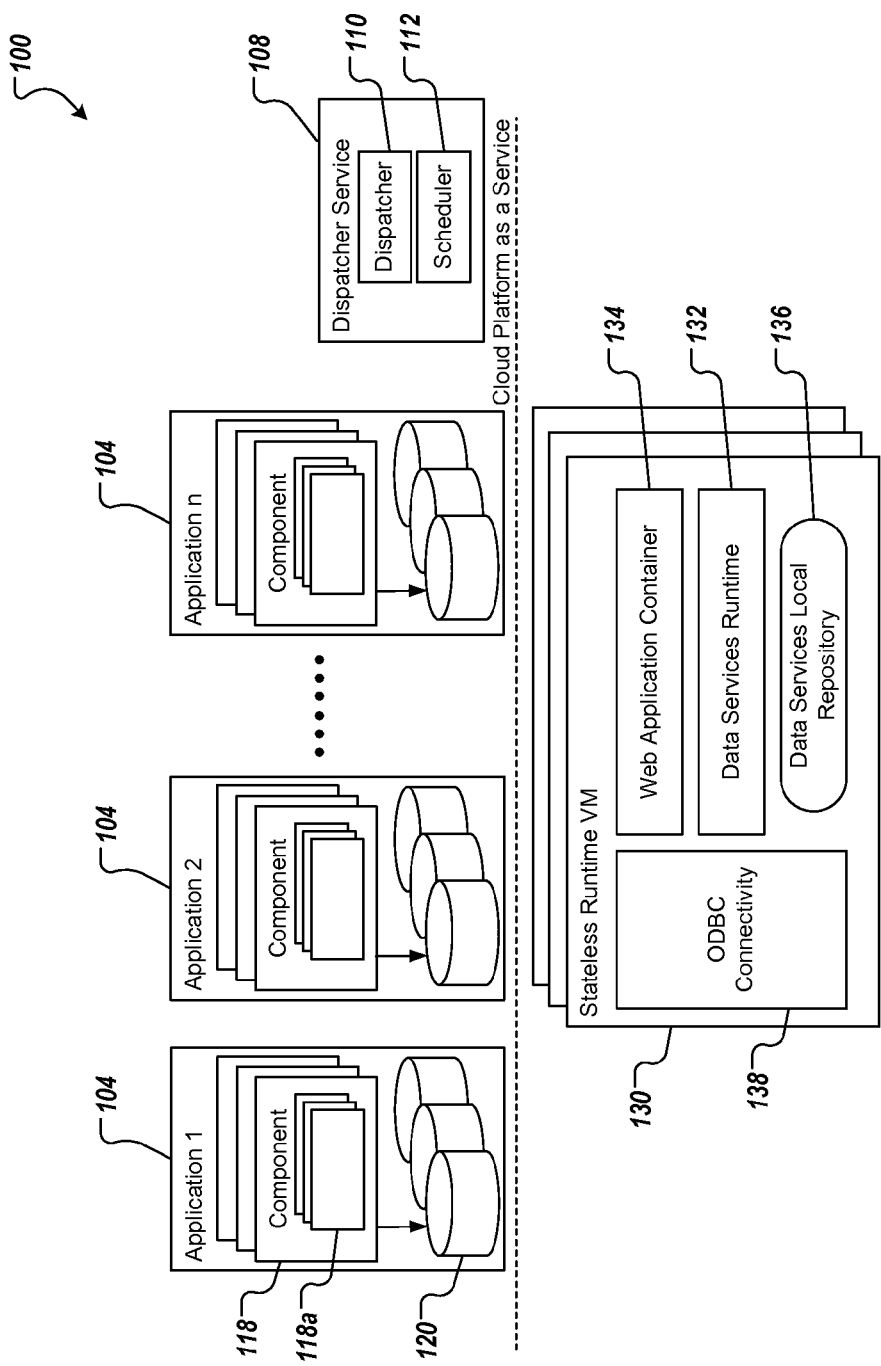
FIG. 1 depicts an example architecture in accordance with implementations of the present disclosure.

Implementations of the present disclosure are generally directed to a high-utilisation architecture and mechanism for extraction, transformation and loading (ETL) services in an on-demand landscape. In some implementations, a service can be provided as a stateless appliance and requiring low-to-no maintenance. As discussed in further detail herein, implementations of the present disclosure enable securely managed, cross-schema data access for applications running on a cloud platform, as well as high utilization and efficient use of resources. Implementations of the present disclosure address both design-time and run-time, and provide a robust and secure solution for both.

In some implementations, services include an ETL data service, a cloud platform service, and on-demand data services. In some implementations, services can each be provided as one or more computer-executable programs executed using one or more computing devices (e.g., servers).

In some examples, the ETL data service provides ETL operations based on a predefined set of instructions or "jobs." In some examples, a job encapsulates the metadata used to establish connections to a source data schema and a target data schema, as well as any transforms that are to be used. In some examples, the ETL data service maintains a database schema (Job Repository) that stores a catalogue of jobs and a job execution history. An example ETL data service can include SAP Data Services provided by SAP AG of Walldorf, Germany.

In some examples, the cloud platform service is provided as a managed platform that enables the deployment and execution of multi-tenant applications. An example cloud platform service can include SAP Netweaver Cloud provided by SAP AG of Walldorf, Germany. In some examples, each application hosted on the cloud platform has an isolated data schema. In some examples, no application hosted on the cloud platform can directly query, or otherwise interact with the schema of another application hosted on the cloud platform. Although this is prudent for application and data isolation, the performance of meaningful data analysis can be inhibited. For example, analytic applications can require a variety of input data sources, and an ETL solution would be required to overcome this isolation. As discussed in further detail herein, implementations of the present disclosure enable communication between hosted applications, while maintaining isolation.

In some examples, applications hosted on the cloud platform can be referenced using an abstract coordinate system. In this manner, physical redeployment or readdressing of applications can be provided, while maintaining transparent logical access. In some examples, the coordinate system can also be used to reference the associated schema using a secure persistence service provided by the cloud platform. In some examples, the persistence service manages all interaction between applications hosted on the cloud platform and their associated data schemas. In practice, the persistence service resolves the coordinate system to an actual database uniform resource locator (URL) at run-time on a per request basis. Consequently, any such resolution request results in the correct URL at that moment in time, and repeated requests with the same coordinates may result in different URLs as resources are managed by the cloud platform and can be relocated.

In accordance with implementations of the present disclosure, on-demand data services are provided using a platforms job repository, a dispatcher service, a data services client library, and virtual machines (VM) provided as stateless runtime VMs. Each of these components is discussed in further detail below.

In some implementations, the job repository is provided in computer-readable memory and is provided on the cloud platform. In some examples, the job repository stores ETL jobs and associated coordinate metadata. In some examples, the jobs can be retrieved from the job repository at execution time.

In some implementations, the dispatcher service is provided as one or more computer-executable programs executed using one or more computing devices (e.g., servers). In some examples, the dispatcher service is provided as a tenant-aware service and is provided on the cloud platform. In some examples, the dispatcher service securely retrieves jobs from the job repository according to time intervals set by a scheduler component.

In some examples, upon retrieving a job from the job repository, the dispatcher dereferences the application coordinate system to retrieve the correct database credentials and connectivity information. In some examples, the dispatcher maintains a listing of available run-time VMs and their respective execution states, and dispatches a job to an available VM. In some examples, the dispatcher provides a callback mechanism that enables the VMs to provide logging information. In this manner, the dispatcher can monitored and record the respective states of execution of the VMs.

In some implementations, the data services client library is a utility that is included with each application hosted on the cloud platform that wants to make use of the dispatcher service. In some examples, the data services client library is provided as a computer-readable document and/or a computer-executable program that can be integrated with or accessed by hosted applications. In some examples, the data services client library handles interaction between a respective application and the dispatcher services.

In some implementations, each run-time VM is provided as a stateless engine that executes jobs (e.g., ETL jobs). In some examples, and in this context, statelessness differentiates the VMs from a standard data services runtime implementation. More particularly, a data services installation on a given host ordinarily includes a repository that stores all jobs, and the host also stores all database connections using standard open database connectivity (ODBC) settings, for example. While a single on-premise enterprise can rely on such a configuration, multi-tenant cloud-based scenarios cannot.

In accordance with implementations of the present disclosure, a standard data services installation is wrapped in a web-application that brokers all access. In some examples, the web-application receives jobs from the dispatcher service, dynamically writes the ODBC information, executes the job, streams log information back to the dispatcher, and, when the job is complete, deletes the connectivity and job information from the host. In this manner, the host is returned to the state prior to execution of the job. Consequently, and at run-time, this means that any given VM can only access the databases that have been allocated using the dispatcher service, and can only execute the jobs sent by the dispatcher service. Accordingly, each VM can be reallocated as soon as execution completes to handle any available job. In this manner, each VM has the potential to achieve a utilization rate of 100%.

FIG. 1 depicts an example architecture 100 in accordance with implementations of the present disclosure. The example architecture 100 provides a cloud platform 102 that hosts a plurality of applications 104. The cloud platform 102 further provides a dispatcher service 108. In the depicted example, the dispatcher service includes a dispatcher component 110 and a scheduler component 112.

In some examples, each application includes one or more components 118, and each component 118 is associated with a respective dedicated schema 120. Each component 118 in turn includes one or more bundles 118a. In accordance with implementations of the present disclosure, at least one component 118 within a given application 104 includes a data services client library bundle 118a. In some examples, the data services client library interacts with a set of tables provided in the associated schema 120, the tables including an application job repository. In accordance with the constraints addressed by the present disclosure, no component 118 is able to access the schema 120 of another component and vice versa. More particularly, components 118 within the same application 104 are unable to access each other's schemas 120, and components 118 in different applications 104 are unable to access each other's schemas 120.

The example architecture 100 further includes a plurality of stateless run-time VMs 130. In some examples, each VM 130 includes a standard installation of a data services run-time 132, as well as a web-application 134 to handle interaction with the dispatcher service 108, a data services local repository 136, and a standard operating system level ODBC connectivity service 138. An example ODBC connectivity service can include unixODBC for Linux.

In accordance with implementations of the present disclosure, a plurality of processes are provided that drive run-time architectures (e.g., the example architecture 100 of FIG. 1). FIGS. 2-7 depict example processes that can be executed in accordance with implementations of the present disclosure. The example processes can include a design-time process (FIG. 2), a VM registration process (FIG. 3), a job scheduling process (FIG. 4), a dispatcher run-time execution process (FIG. 5), a VM run-time execution process (FIG. 6), and a run-time monitoring process (FIG. 7).

In some implementations, at design-time, jobs are designed using a data services designer. In some examples, a job is provided as an ETL job and includes a plurality of tasks that are to be performed to provide ETL functionality. In some examples, the data services designer is provided as one or more computer-executable programs executed using one or more computing devices. In accordance with implementations of the present disclosure, rather than publishing the jobs to a given data services run-time repository, the jobs are enhanced with additional metadata and are uploaded to the job repository (e.g., the job repository 106 of FIG. 1). In some examples, the additional metadata includes the coordinates of the deployed application (e.g., the applications 104 of FIG. 1) for each data source that has been modeled. In some examples, the coordinates can be used at run-time to access the associated application schema (e.g., the application schemas 120 of FIG. 1).

In further detail, data services designer enables jobs to be created and exported in a standard format. An example format includes ATL. For on-demand data services in accordance with the present disclosure, the jobs are exported (e.g., in ATL), and the exported job forms the basis of a respective job document (e.g., an extensible mark-up language (XML) document). In some examples, the job document is encoded to ensure that special characters, for example, are preserved, as well as metadata for each connection defined in the job. For example, the job document includes a Base64 encoded version of job export (e.g., in ATL).

In some examples, ATL documents specify database data sources in terms of data source names (DSNs) (e.g., ODBC DSNs). In some examples, each DSN references a specific database schema, and can include associated access credentials. In some examples, for on-demand data services, the database schema location is not known at run-time. Consequently, the job document (e.g., XML document) includes a mapping for each DSN to a particular set of platform coordinates that can be resolved at run-time. In this manner, the DSNs are decoupled from the actual databases. The job document (e.g., XML document) is published to the job repository, from which the underlying job can be scheduled for execution.

An example structure for a job document, in XML, can be provided as:

```
<atlCloudContainer>
    <DSNInfo>
        <Space>...</Space>
        <Appliance>...</Appliance>
        <Component>...</Component>
    </DSNInfo>
    <DSNInfo>...</DSNInfo>
    ...
    <ATL64>...</ATL64>
    <name>...</name>
</atlCloudContainer>
```

Each job document can contain many <DSNInfo> fragments, each fragment representing a particular database that is to be accessed at run-time. In the example job document, the space-appliance-component tuple (triple) represents the coordinate system of the deployed application. In some examples, this can be resolved to an instance of the corresponding database schema at runtime. In the example job document, <ATL64> contains the Base64-encoded version of the job, while <name> is the name of the job itself.

Figure 2:
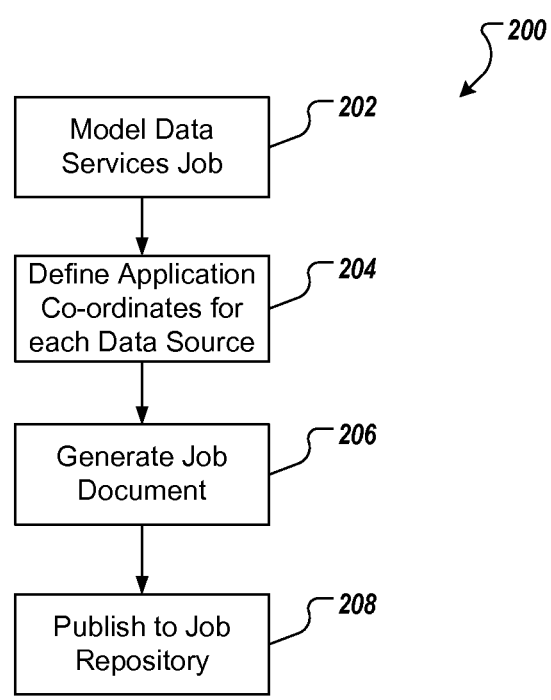
FIGS. 2-7 depict example processes that can be executed in accordance with implementations of the present disclosure.

Referring now to FIG. 2, an example process 200 will be discussed in detail. The example process 200 includes a design-time process for creating and publishing jobs to the job repository. A data services job is modeled (202). For example, a designer can model a data services job using a data services design application executed on a computing device. Application coordinates are defined for each data source (204). A job document is generated (206). For example, the data services design application can generate the job document as a computer-readable file based on the model and the application coordinates. In some examples, the job document is generated as an XML document. The job document is published to the job repository (208). For example, the job document is stored and indexed in the job repository.

Figure 3:
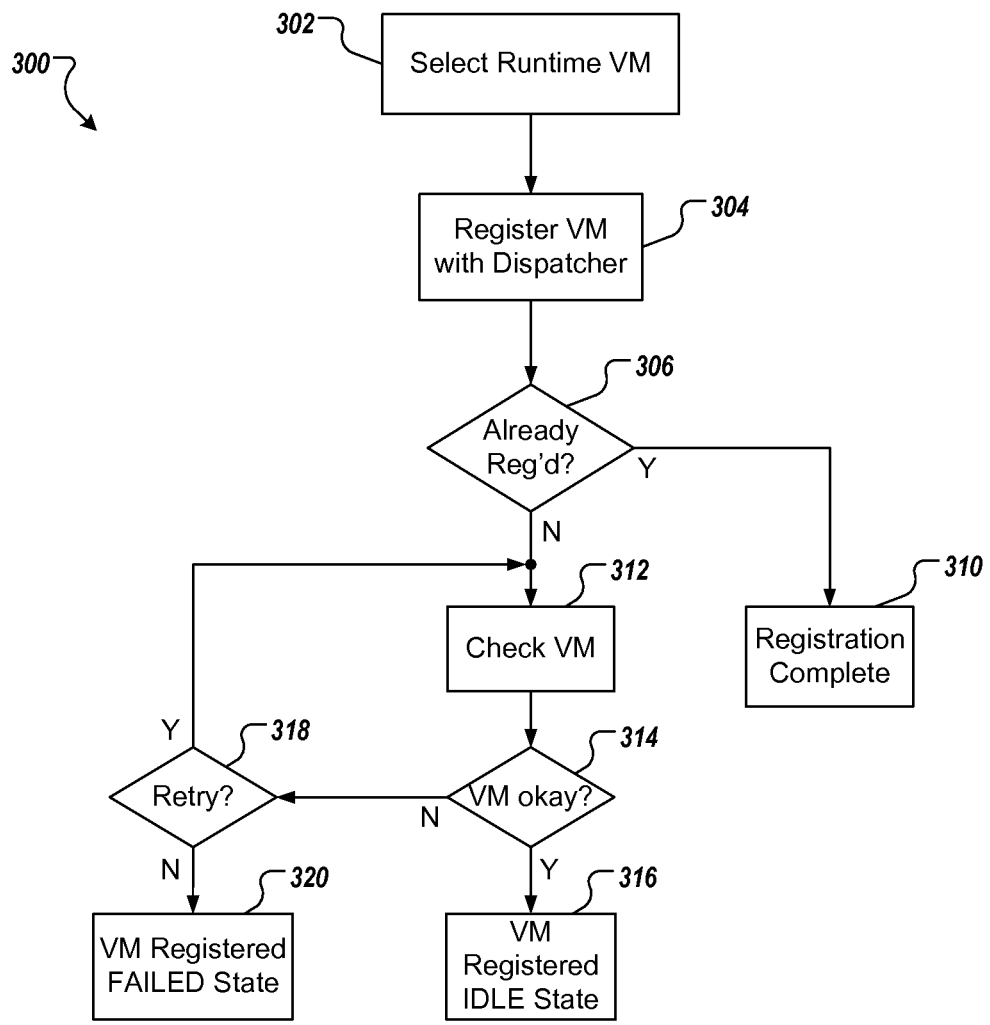

Referring now to FIG. 3, an example process 300 will be discussed in detail. The example process 300 includes a process for registering run-time VMs that can be used to provide on-demand data services in accordance with implementations of the present disclosure.

A run-time VM is selected (302). For example, a run-time VM can be selected from a pool of run-time VMs. In some examples, the VM is selected by the dispatcher service. An attempt is made to register the VM with the dispatcher service (304). For example, the VM is associated with a unique identifier (ID) that the dispatcher service uses to register the VM in an index of registered VMs. In some examples, the dispatcher service uses the index of registered VMs to monitor and record the respective states of execution of the VMs during run-time, as discussed in further detail herein.

It is determined whether the VM is already registered (306). If the VM is already registered, registration is complete (310) and the process 300 exits.

If it is determined that the VM is not already registered, the VM is checked (312). In some examples, a VM is queried to determine the status of the various services therein. It is determined whether the VM is operating properly (314). For example, the results of the query to the VM determine whether the VM is operating properly. If the VM is operating properly, the VM is registered and a current state of the VM is set to IDLE (316). If the VM is not operating properly, it is determined whether to retry checking of the VM (318). In some examples, a threshold number of attempts can be made to check proper operation of the VM. If the threshold number of attempts has not been achieved, it is determined to retry checking of the VM, and the example process 300 loops back. If the threshold number of attempts has been achieved, the VM is registered and a current state of the VM is set to FAILED (320), and the example process 300 exits.

Figure 4:
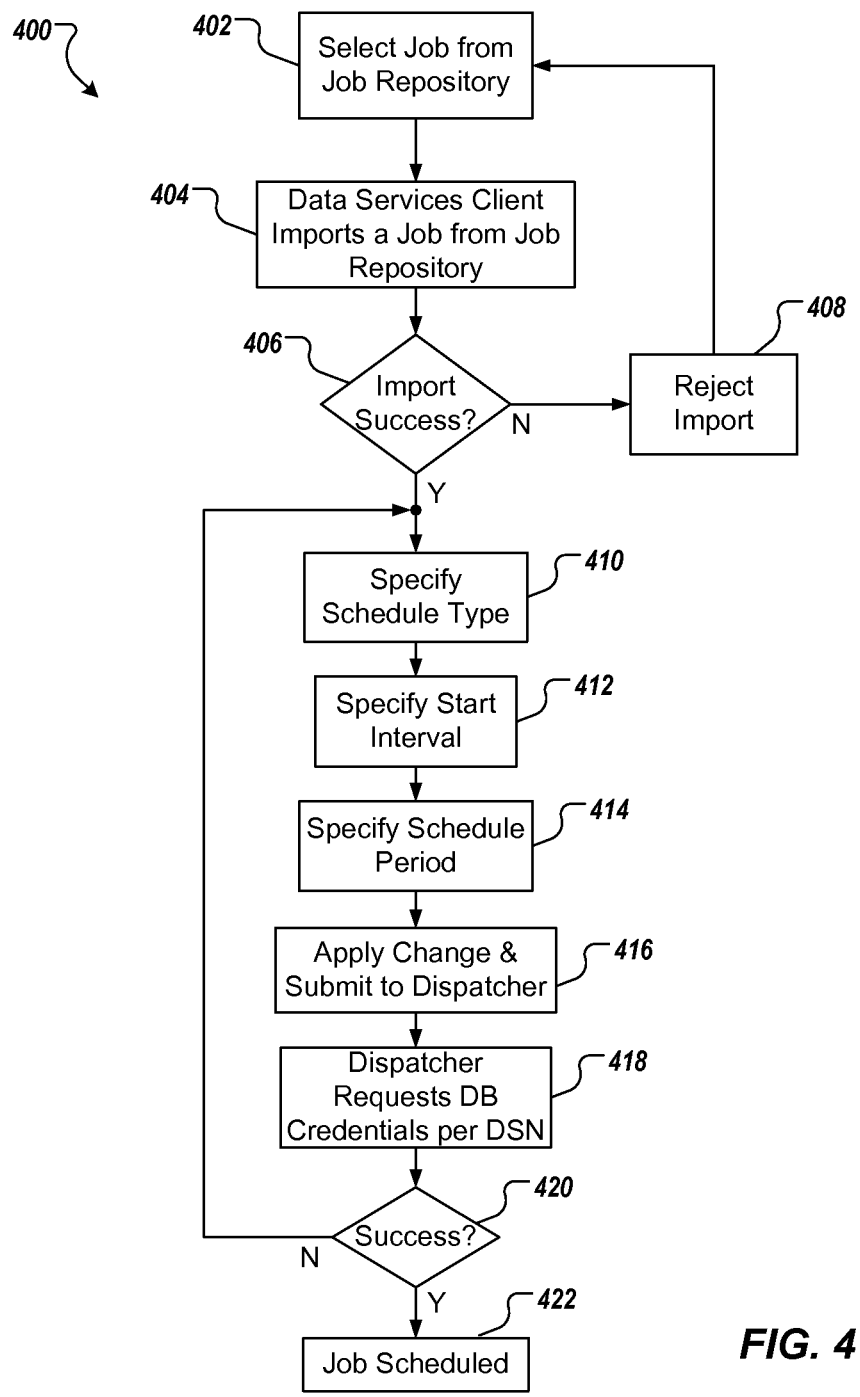

Referring now to FIG. 4, an example process 400 will be discussed in detail. The example process 400 is directed to scheduling a job to be executed by a registered run-time VM.

A job (e.g., ETL job) is selected from the job repository (402). For example, a hosted application can require execution of a particular job and can select a corresponding job from the job repository. In some examples, selection of a job is triggered in response to user input received by an application. In some examples, each hosted application can access an index of jobs that are available in the job repository. A data services client attempts to import the selected job from the job repository (404). For example, and as discussed above, the hosted application that selected the job includes the data services client, which attempts the job import. It is determined whether the import was successful (406). If the import was not successful, the import is rejected (408), and the example process 400 loops back.

If the import was successful, a schedule type is specified (410). In some examples, scheduling can be set to either an interval-based period, or to a single immediate execution. If an interval-based period is selected, a start interval is specified (412) and a period is specified (414). For immediate execution, the job is submitted to the dispatcher (416). The dispatcher requests database credentials (e.g., username, password) based on the associated DSN (418). It is determined whether the credentials have been successfully received (420). If not successful, the example process 400 loops back to specify the scheduling parameters. If successful, the job is scheduled (422).

Implementations of the present disclosure further address execution of the dispatcher service at run-time. In some examples, a dispatcher run-time process is initiated when the scheduler (e.g., the scheduler 112 of FIG. 1) requests that a given job is executed. In some examples, the dispatcher (e.g., the dispatcher 110 of FIG. 1) retrieves the job from the job repository and requests database credentials for each DSN from the persistence service. A set of database URLs and access credentials are provided to the dispatcher in response.

If a run-time VM is available (e.g., a VM in of the registered VM has a status of IDLE), the dispatcher allocates the job to the VM, and dispatches a message to the VM. In some examples, the message is provided as an XML message that includes the job, the database metadata for each DSN, the name of the job, a unique ID for the specific request and a callback endpoint that will receive log messages from the VM. In some examples, the job is encoded in Base64. An example structure of the XML document can be provided as:

```
<JobStore>
    <databaseMetaData>
        <space>...</space>
        <applicance>...</appliance>
        <component>...</component>
        <dsnName>...<dsnName>
        <userName>...<userName>
        <password>...<password>
        <URL>...</URL>
    </databaseMetaData>
    <databaseMetaData>...</databaseMetadata>
    ...
    <requestID>...</ requestID >
    <responseEndpoint>...</responseEndpoint>
    <jobName>...</jobName>
    <model>...</model>
</JobStore>
```

In this example, there is a <databaseMetaData> element for every DSN, which contains the URL, username and plain-text password for that database. The <requestID> element is a unique ID generated by the dispatcher for each execution instance. In some examples, the unique ID is used by the <responseEndpoint> URL to match log messages to the particular request for execution. The <jobName> is the name of the ETL job to be executed, and the <model> element contains the job (e.g., Base64-encoded).

Once the job has started executing on the run-time VM, a synchronous response is sent back to the dispatcher confirming that the job is either running or could not be started. If the job is running, it is marked as RUNNING, otherwise it is marked as either SCHEDULED or FAILED, as discussed in further detail below. In some examples, upon completion of the job, the VM sends a message to the dispatcher. In some examples, the message is provided as a reset complete message. In response, the dispatcher marks the status of the VM as IDLE, indicating that the VM can be allocated to execute another job.

Figure 5:
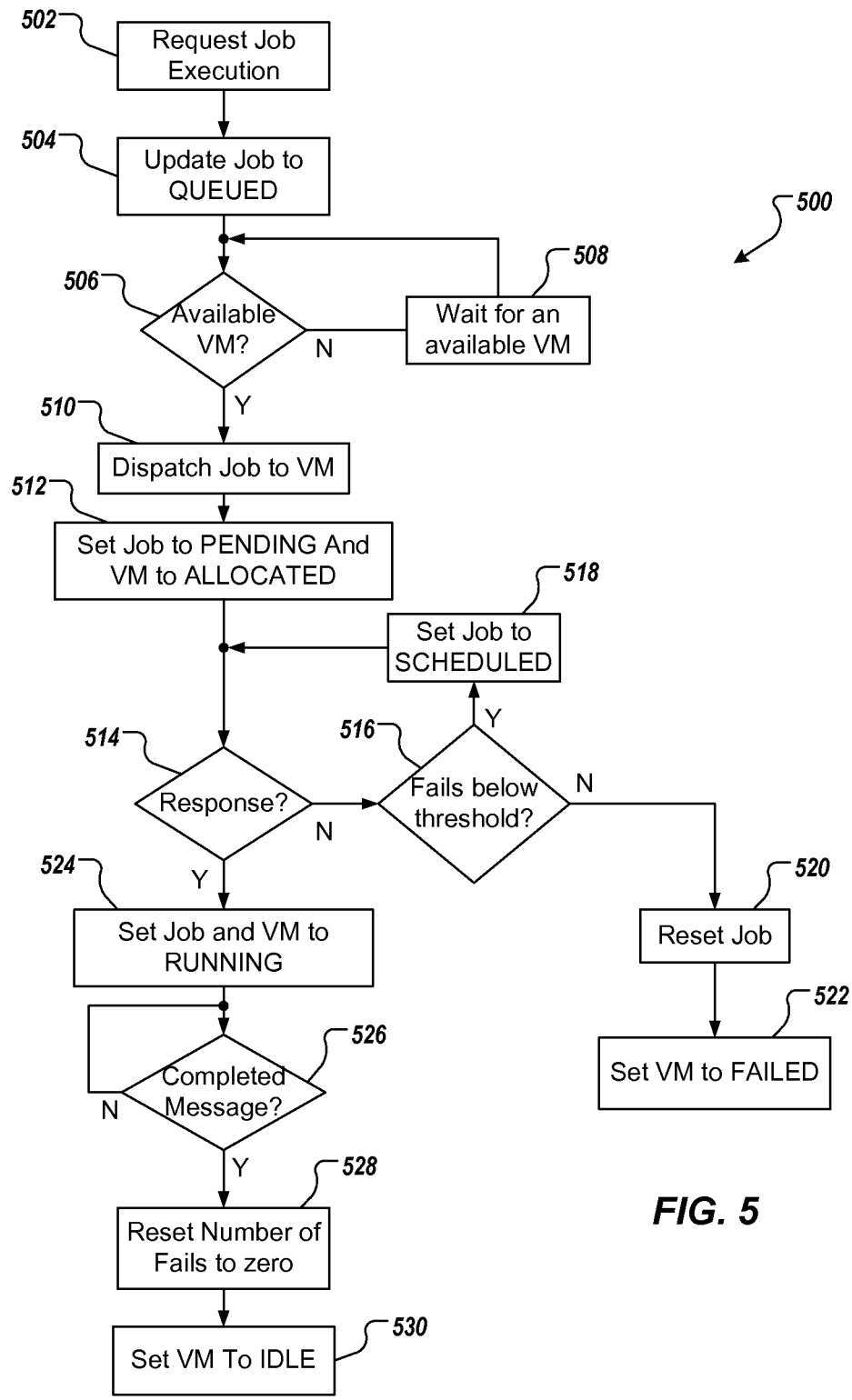

Referring now to FIG. 5, an example process 500 will be discussed in detail. The example process 500 is directed to run-time execution of the dispatcher.

Execution of a job is requested (502). A status associated with the job is updated to QUEUED (504). For example, the scheduler updates the job status. It is determined whether a VM is available (506). For example, the dispatcher checks the statuses of the registered VM. IF a status of a registered VM is IDLE, the VM is available. If none of the statuses are IDLE, a VM is not available. If a VM is not available, the dispatcher waits for an available VM (508). For example, the dispatcher can wait until a VM sends a reset complete message, discussed above.

If a VM is available, the job is dispatched to the VM (510). For example, and as discussed above, the dispatcher allocates the job to the VM, and dispatches a message to the VM. The status of the job is set to PENDING and the status of the VM is set to ALLOCATED (512). Consequently, the particular VM can be determined to be unavailable for subsequent jobs. It is determined whether a response is received (514). In some examples, a VM that has been allocated a job sends a response (confirmation message) back to the dispatcher. If the response has not been received, it is determined whether the response has failed a threshold number of times (516). If the response has not failed a threshold number of times, the status of the job is set to SCHEDULED (518), and the example process 500 loops back. If the response has failed a threshold number of times, the job is set to RESET (520). In some examples, if, a RESET state complete message has not been received after a specified period of time, the dispatcher pre-emptively determines that the job has failed. The fail count is incremented and the VM is returned to an IDLE state if the threshold has not been exceeded (516). If the threshold has been exceeded, the job is set to state RESET (520).

If the response is received, the status of the job and the status of the VM are set to RUNNING (524). It is determined whether a reset complete message has been received (526). If a reset complete message, discussed above, has not been received, the example process 500 loops back. If the reset complete message has been received, the number of fails is reset (528) and the status of the VM is set to IDLE (530). In this manner, the VM is again available to handle another job.

Implementations of the present disclosure further address execution of the VM at run-time. In some examples, VMs interact with the dispatcher through an interface. An example interface includes a representational state transfer (REST)-ful web interface. In some examples, when a job is dispatched to a VM, the VM receives a message from the dispatcher (e.g., the XML message discussed above). In some examples, the VM extracts the DSN information for each data source listed in the message and writes new ODBC entries for each data source. In some examples, the VM decodes the Base64 version of the ATL job, discussed above. At design-time (when the job was defined), the usernames and passwords that are used at run-time were unknown. Consequently, the VM rewrites these entries to match credentials that had been retrieved by the dispatcher from the persistence service. In some examples, the data services run-time can require that all passwords are encrypted using its own encryption service. In some examples, encryption can be performed for each password prior to rewrite. A rewritten document (ATL document) is published to the data services local repository of the VM (e.g., the data services local repository 136 of FIG. 1).

In some implementations, the VM requests that the job is executed by the data services runtime. The data services runtime provides a response that includes a process ID for the executing job. In some examples, the VM initiates a separate monitor thread that can use the process ID to monitor execution for the job. The VM sends a synchronous response to the initial message from the dispatcher confirming that the job has started. If, for example, the job could not start, the synchronous response instead includes an appropriate error message.

Figure 6:
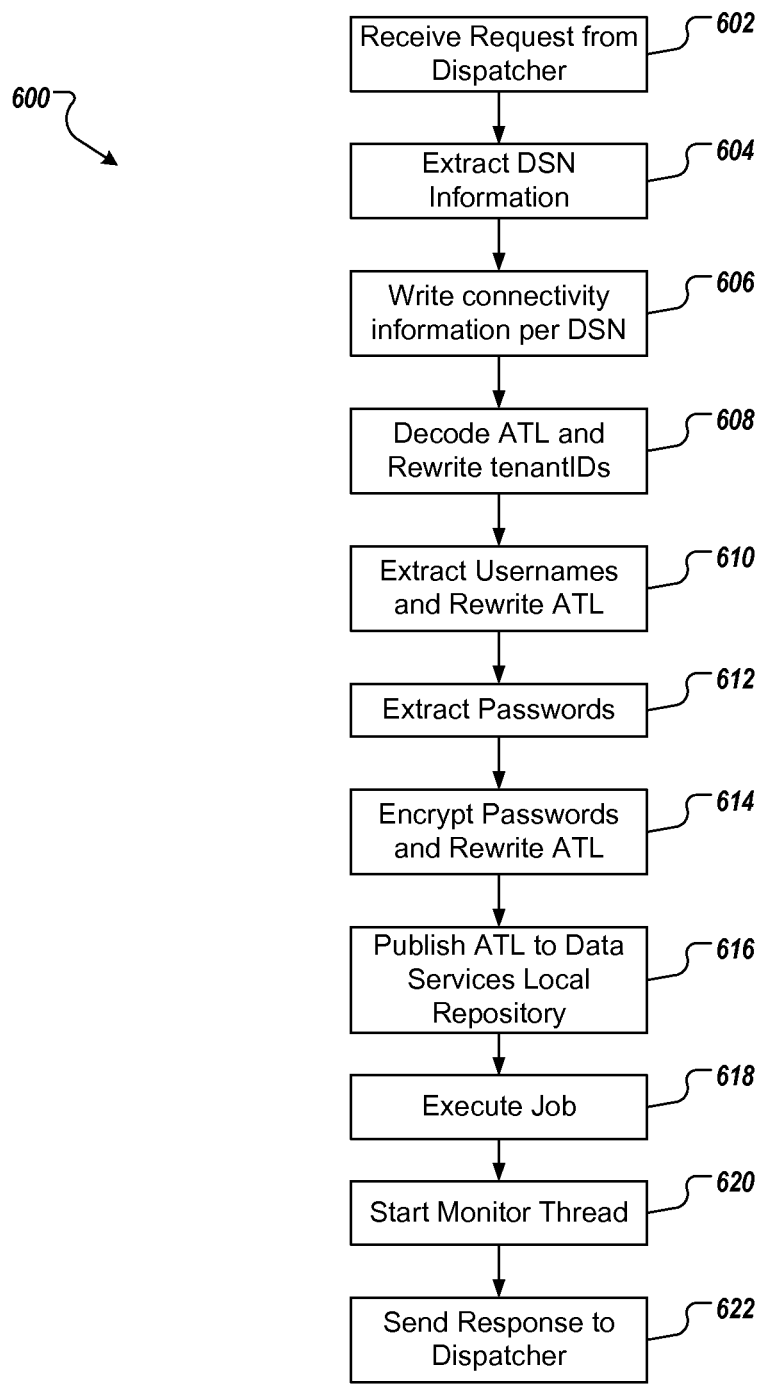
Figure 7:
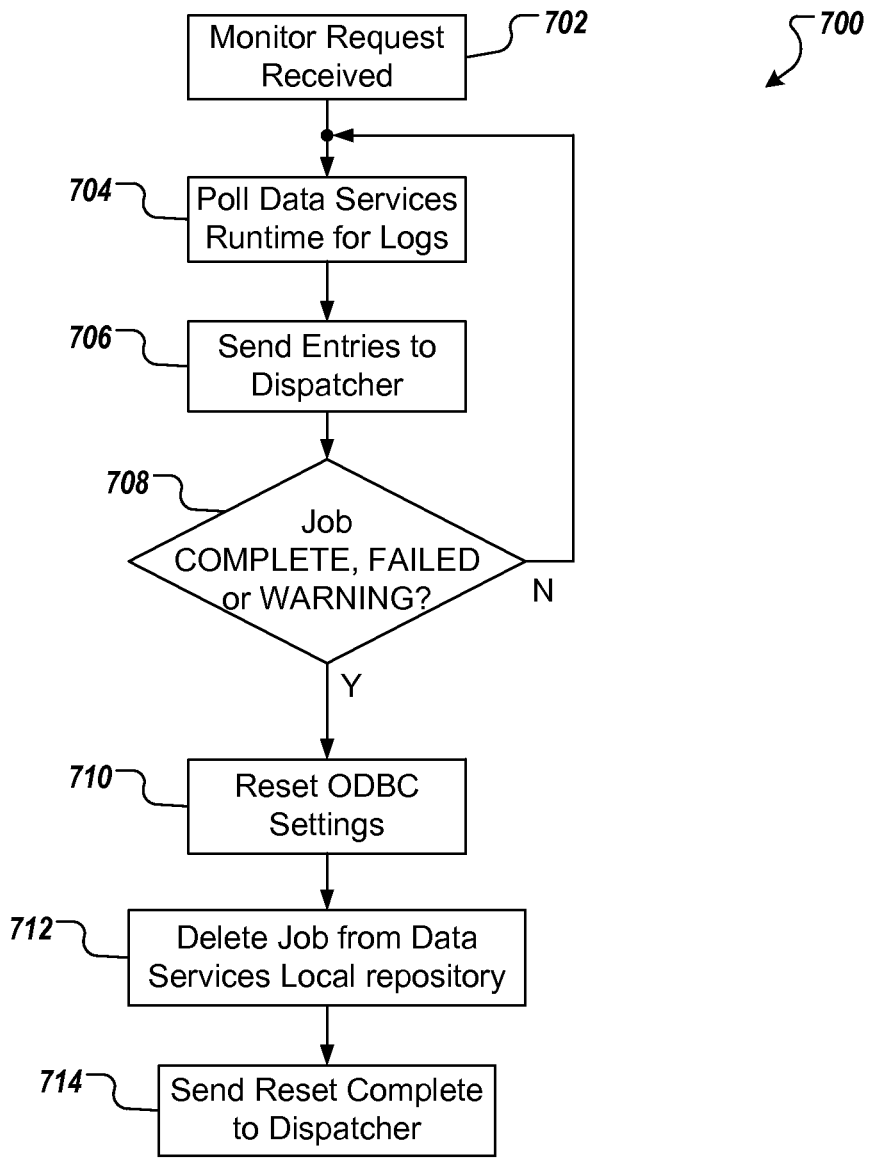

Referring now to FIG. 6, an example process 600 will be discussed in detail. The example process 600 is directed to run-time execution of the VM.

A request is received from the dispatcher (602). For example, the dispatcher provides a REST call to a selected VM to assign execution of a job to the VM. DSN information is extracted (604). For example, the VM extracts DSN information from the message (e.g., XML message). Connectivity information (ODBC connectivity information) is written for each DSN (606). The ATL document is decoded and tenantIDs are rewritten (608). Usernames are extracted and the ATL document is rewritten to include the usernames (610). Passwords are extracted (612). The passwords are encrypted and the ATL document is rewritten to include the encrypted passwords (614). The ATL document is published to the data services local repository (616) and the job is executed (618). A monitoring thread is started (620), and a response is sent to the dispatcher (622).

Implementations of the present disclosure further address monitoring execution of the job. In some examples, when a VM has successfully started executing a job, the VM initiates a monitor thread that can poll for updates and send information back to the dispatcher. In some examples, the monitor thread uses the process ID of the job and the response endpoint specified by the dispatcher. In some examples, and based on a pre-defined polling interval, the monitor thread requests trace and error logs from the data services runtime, and generate a response (e.g., in XML) based thereon. The responses are sent the dispatcher response endpoint. In some examples, if the overall state of the job comes back as COMPLETE, FAILED or WARNING the monitor thread begins resetting the state of the VM by deleting any ODBC credentials that have been set by the job and by deleting the job itself from the data services local repository. Once this is complete, the VM sends a final response (the reset complete message) to the endpoint (the dispatcher) confirming that the VM has been reset and is available for future jobs.

Referring now to FIG. 7, an example process 700 will be discussed in detail. The example process 700 is directed to monitoring run-time execution of a job.

A monitor request is received (702). The data services run-time is polled for log data (704). Log entries received in response to a poll request are sent to the dispatcher (706). It is determined (e.g., from the log entries) whether the state of job execution is COMPLETE, FAILED or WARNING (708). If it is determined that the state of job execution is none of COMPLETE, FAILED or WARNING, the example process 700 loops back. If it is determined that the state of job execution is any of COMPLETE, FAILED or WARNING, the connectivity settings (ODBC connectivity settings) are reset (710), the job is deleted from the data services local repository (712), and a reset complete message is sent to the dispatcher (714).

Figure 8:
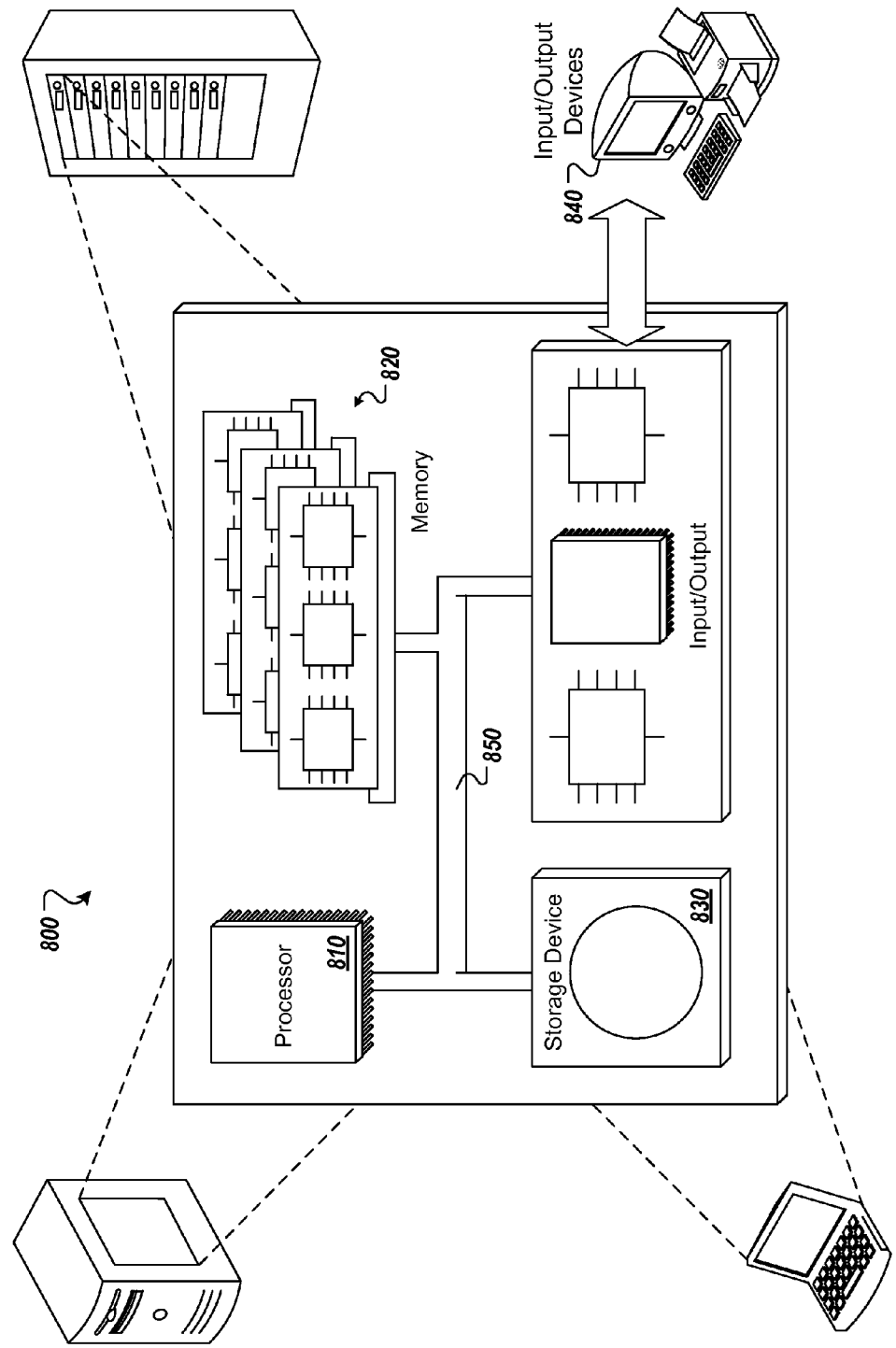
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing on-demand data services, the method being executed using one or more processors and comprising:

during a design-time, storing a data services job in a job repository, the data services job being stored as a computer-readable document, the computer-readable document comprising one or more fragments, each fragment representing a particular data source that is to be accessed at run-time, and one or more tuples, each tuple representing coordinates of an application of a plurality of applications within a cloud platform;

receiving, by the one or more processors, a request for execution of the data services job, the data services job comprising interactions between a first application of the plurality of applications hosted on the cloud platform and a plurality of application components within a second application of the plurality of applications hosted on the cloud platform, each of the plurality of applications comprising one or more application schemas, each of the one or more application schemas only being accessible by a respective application component within the respective application of the plurality of applications;

in response to the request, retrieving, by the one or more processors, the data services job from the job repository;

scheduling, by the one or more processors, execution of the data services job by a virtual machine (VM) of a plurality of VMs, the VM being stateless and providing interaction between the first application of the plurality of applications and the plurality of application components, each VM of the plurality of VMs comprises a data services component that is wrapped in a web-application, the web-application brokering access between data sources during execution of the data service job, receives data services job, writes connectivity information based on a received data services job, executes the received data services job, and provides log information indicating a status of the received data services job; and executing, by the VM, the data services job.

2. The method of claim 1, wherein the web-application deletes connectivity information from the VM in response to completion of the data services job.

3. The method of claim 1, wherein the VM is only able to access one or more data sources associated with the data services job during execution of the data services job.

4. The method of claim 1, wherein the computer-readable document provides a mapping between one or more data sources and one or more platform coordinates, each platform coordinate indicating a location of an application of the plurality of applications within the cloud platform.

5. The method of claim 1, further comprising, during design time:
   generating a document having a first format; and
   exporting the document to provide the computer-readable document, the computer-readable document having a second format that is different from the first format.

6. The method of claim 5, wherein the second format comprises Extensible Markup Language (XML).

7. The method of claim 1, further comprising transmitting a message to the VM, the message comprising the data services job, data source metadata for each data source that is to be accessed during execution of the data services job.

8. The method of claim 7, wherein the message further comprises a name of the data services job, a unique identifier, and a callback endpoint for receiving log messages from the VM.

9. The method of claim 7, wherein the data source metadata comprises credentials and a resource locator for each data source that is to be accessed during execution of the data services job.

10. The method of claim 1, further comprising completing execution of the data services job, wherein, in response to completion of the data services job, the VM deletes connectivity credentials associated with the data services job, delete the data services job from a repository that is local to the VM, and transmits a confirmation message indicating that the VM is reset and is available for execution of a subsequent data services jobs.

11. A non-transitory computer-readable storage medium coupled to one or more processors and having instructions stored thereon which, when executed by the one or more processors, cause the one or more processors to perform operations for providing on-demand data services, the operations comprising:
   during a design-time, storing a data services job in a job repository, the data services job being stored as a computer-readable document, the computer-readable document comprising one or more fragments, each fragment representing a particular data source that is to be accessed at run-time, and one or more tuples, each tuple representing coordinates of an application of a plurality of applications within a cloud platform;
   receiving a request for execution of the data services job, the data services job comprising interactions between a first application of a plurality of applications hosted on the cloud platform and the plurality of application components within a second application of the plurality of applications hosted on the cloud platform, each of the plurality of applications comprising one or more application schemas, each of the one or more application schemas only being accessible by a respective application component within the respective application of the plurality of applications;
   in response to the request, retrieving the data services job from a job repository;
   scheduling execution of the data services job by a virtual machine (VM) of a plurality of VMs, the VM being stateless and providing interaction between the first application of the plurality of applications and the plurality of application components, each VM of the plurality of VMs comprises a data services component that is wrapped in a web-application, the web-application brokering access between data sources during execution of the data service job, receives data services job, writes connectivity information based on a received data services job, executes the received data services job, and provides log information indicating a status of the received data services job; and
   executing, by the VM, the data services job.

12. A system, comprising:
   a computing device comprising one or more processors; and
   a non-transitory computer-readable storage device coupled to the computing device and having instructions stored thereon which, when executed by the computing device, cause the computing device to perform operations for providing on-demand data services, the operations comprising:
   during a design-time, storing a data services job in a job repository, the data services job being stored as a computer-readable document, the computer-readable document comprising one or more fragments, each fragment representing a particular data source that is to be accessed at run-time, and one or more tuples, each tuple representing coordinates of an application of a plurality of applications within a cloud platform;
   receiving a request for execution of the data services job, the data services job comprising interactions between a first application of the plurality of applications hosted on the cloud platform and a plurality of application components within a second application of the plurality of applications hosted on the cloud platform, each of the plurality of applications comprising one or more application schemas, each of the one or more application schemas only being accessible by a respective application component within the respective application of the plurality of applications;
   in response to the request, retrieving the data services job from a job repository;
   scheduling execution of the data services job by a virtual machine (VM) of a plurality of VMs, the VM being stateless and providing interaction between the first application of the plurality of applications and the plurality of application components, each VM of the plurality of VMs comprises a data services component that is wrapped in a web-application, the web-application brokering access between data sources during execution of the data service job, receives data services job, writes connectivity information based on a received data services job, executes the received data services job, and provides log information indicating a status of the received data services job; and
   executing, by the VM, the data services job.

* * * * *